(12) United States Patent
Cho et al.

(10) Patent No.: US 11,314,379 B2
(45) Date of Patent: Apr. 26, 2022

(54) METHOD AND SYSTEM FOR PROVIDING USER INTERFACE FOR DEVICE CONTROL

(71) Applicant: Samsung Electronics Co., Ltd., Gyeonggi-do (KR)

(72) Inventors: Hyung-rae Cho, Seoul (KR); Ji Hyeon Kweon, Gyeonggi-do (KR); Seok-min Oh, Gyeonggi-do (KR)

(73) Assignee: Samsung Electronics Co., Ltd

( * ) Notice: Subject to any disclaimer, the term of this patent is extended or adjusted under 35 U.S.C. 154(b) by 317 days.

(21) Appl. No.: 15/483,665

(22) Filed: Apr. 10, 2017

(65) Prior Publication Data

US 2017/0212649 A1 Jul. 27, 2017

Related U.S. Application Data

(63) Continuation of application No. 13/689,203, filed on Nov. 29, 2012, now Pat. No. 9,621,369.

(30) Foreign Application Priority Data

Nov. 29, 2011 (KR) .................. 10-2011-0126277
Jul. 17, 2012 (KR) .................. 10-2012-0077921

(51) Int. Cl.
*G06F 3/0482* (2013.01)
*H04L 12/28* (2006.01)
(Continued)

(52) U.S. Cl.
CPC .......... *G06F 3/0482* (2013.01); *G06F 3/0484* (2013.01); *H04L 12/281* (2013.01);
(Continued)

(58) Field of Classification Search
CPC ................................... H04N 21/43615
See application file for complete search history.

(56) References Cited

U.S. PATENT DOCUMENTS 5,604,860 A 2/1997 McLaughlin et al.
6,470,378 B1 10/2002 Tracton et al.
(Continued)

FOREIGN PATENT DOCUMENTS

CN 1770724 5/2006
CN 1866996 11/2006
(Continued)

OTHER PUBLICATIONS

K. Sung, J. Choi and H. Oh, "Management system for Customized Individual Service using User Behavior Pattern Analysis Algorithm on HomeNetwork," 2007 International Conference on Multimedia and Ubiquitous Engineering (MUE'07), Seoul, 2007, pp. 542-547, doi: 10.1109/MUE.2007.146. (Year: 2007).*

(Continued)

*Primary Examiner* — William L Bashore
*Assistant Examiner* — Nathan K Shrewsbury
(74) *Attorney, Agent, or Firm* — The Farrell Law Firm, P.C.

(57) ABSTRACT

A user interface (UI)-providing system and method for device control are provided. The User Interface (UI) providing method, the method includes: identifying at least one controlled devices relating to an activity mode selected by a user; collecting control information relating to functions provided by the identified at least one controlled devices; and generating a UI used to control the at least one controlled devices relating to the activity mode based on the collected control information.

8 Claims, 10 Drawing Sheets

| DAYS | TIME | CONTROLLED DEVICES | CONTROL FUNCTIONS | NUMBERS |
|---|---|---|---|---|
| MONDAY | 9:00~9:30 | TV | VOL+ | 10 |
| | | | VOL- | 9 |
| | | | CH+ | 5 |
| | | | CH- | 3 |
| MONDAY | 9:00~9:30 | LIGHTING DEVICE | BRIGHTNESS + | 5 |
| | | | BRIGHTNESS - | 4 |
| | | | ON/OFF | 9 |
| MONDAY | 9:00~9:30 | AIR CONDITIONER | COOL | 7 |
| | | | HEAT | 5 |
| | | | AUTO | 5 |
| TUESDAY | 15:00~17:00 | RADIO | ON/OFF | 5 |
| | | | VOL+ | 7 |
| | | | VOL- | 6 |
| ... | ... | ... | ... | ... |

Column header positions: 70, 72, 74, 76, 78

(51) Int. Cl.
    *H04N 21/41*        (2011.01)
    *H04N 21/436*       (2011.01)
    *H04N 21/442*       (2011.01)
    *H04N 21/482*       (2011.01)
    *H04N 21/485*       (2011.01)
    *G06F 3/0484*       (2022.01)
    *H04M 11/00*        (2006.01)

(52) U.S. Cl.
    CPC ...... *H04L 12/2803* (2013.01); *H04L 12/2809* (2013.01); *H04M 11/007* (2013.01); *H04N 21/4131* (2013.01); *H04N 21/43615* (2013.01); *H04N 21/44227* (2013.01); *H04N 21/482* (2013.01); *H04N 21/485* (2013.01)

(56) References Cited

U.S. PATENT DOCUMENTS

| | | | |
|---|---|---|---|
| 6,526,581 B1 | 2/2003 | Edson | |
| 6,597,374 B1 | 7/2003 | Baker et al. | |
| 6,756,998 B1* | 6/2004 | Bilger | H04L 12/2803 715/734 |
| 6,859,214 B2 | 2/2005 | Williams et al. | |
| 6,868,292 B2 | 3/2005 | Ficco et al. | |
| 6,879,351 B1 | 4/2005 | Brown | |
| 6,885,362 B2 | 4/2005 | Suomela | |
| 7,127,305 B1 | 10/2006 | Palmon | |
| 7,340,460 B1 | 3/2008 | Kapur et al. | |
| 7,627,825 B2 | 12/2009 | Kakuda | |
| 7,668,990 B2* | 2/2010 | Krzyzanowski | G05B 19/042 710/72 |
| 7,895,532 B2 | 2/2011 | Scott et al. | |
| 8,108,898 B2* | 1/2012 | Hofrichter | H04L 12/2814 725/50 |
| 8,155,120 B2 | 4/2012 | McCoy et al. | |
| 8,219,071 B2 | 7/2012 | Kokubo et al. | |
| 8,381,117 B2 | 2/2013 | Ueno et al. | |
| 8,464,280 B2 | 6/2013 | Dyer et al. | |
| 8,473,865 B2 | 6/2013 | Huang et al. | |
| 8,745,532 B2 | 6/2014 | Yamao | |
| 9,014,826 B2 | 4/2015 | Yum et al. | |
| 9,621,369 B2* | 4/2017 | Cho | H04M 11/007 |
| 10,156,959 B2* | 12/2018 | Fulker | H04L 12/2818 |
| 2001/0030597 A1* | 10/2001 | Inoue | G05B 15/02 340/3.7 |
| 2002/0180579 A1 | 12/2002 | Nagaoka et al. | |
| 2003/0189509 A1* | 10/2003 | Hayes | G08C 17/02 341/176 |
| 2004/0090315 A1* | 5/2004 | Mackjust | G07C 9/00944 340/426.13 |
| 2005/0172228 A1* | 8/2005 | Kakuda | G08C 19/28 715/234 |
| 2006/0020904 A1* | 1/2006 | Aaltonen | G06F 3/0482 715/850 |
| 2006/0080408 A1* | 4/2006 | Istvan | G11B 27/329 709/219 |
| 2006/0203295 A1* | 9/2006 | D'Silva | A61B 5/7475 358/403 |
| 2007/0018784 A1 | 1/2007 | Yoon et al. | |
| 2007/0108462 A1 | 5/2007 | Park et al. | |
| 2007/0237316 A1* | 10/2007 | Tanabe | H04N 21/42204 379/102.03 |
| 2007/0279389 A1 | 12/2007 | Hoch et al. | |
| 2008/0005679 A1 | 1/2008 | Rimas-Ribikauskas et al. | |
| 2008/0034081 A1 | 2/2008 | Marshall et al. | |
| 2008/0313548 A1 | 12/2008 | Krzyzanowski | |
| 2009/0089225 A1 | 4/2009 | Baier et al. | |
| 2009/0138958 A1 | 5/2009 | Baum et al. | |
| 2009/0150541 A1 | 6/2009 | Georgis | |
| 2009/0196342 A1 | 8/2009 | Divorra Escoda et al. | |
| 2009/0288022 A1 | 11/2009 | Almstrand et al. | |
| 2009/0300620 A1* | 12/2009 | Park | H04N 21/43615 718/100 |
| 2010/0261465 A1* | 10/2010 | Rhoads | H04M 1/72415 455/420 |
| 2010/0286801 A1* | 11/2010 | Yum | F24F 11/30 700/90 |
| 2010/0321201 A1* | 12/2010 | Huang | G08C 23/04 340/12.28 |
| 2011/0028138 A1 | 2/2011 | Davies-Moore et al. | |
| 2011/0072373 A1 | 3/2011 | Yuki | |
| 2011/0128228 A1 | 6/2011 | Van der Byl | |
| 2011/0202181 A1* | 8/2011 | Lee | F24F 11/30 700/276 |
| 2011/0208616 A1* | 8/2011 | Gorman | H04N 21/8355 705/27.1 |
| 2011/0296313 A1* | 12/2011 | Gaxiola | G08C 17/02 715/744 |
| 2012/0110490 A1* | 5/2012 | Keller | G06F 3/0484 715/771 |
| 2012/0274863 A1 | 11/2012 | Chardon et al. | |
| 2013/0135118 A1* | 5/2013 | Ricci | G06N 5/02 340/932.2 |
| 2013/0139089 A1* | 5/2013 | Cho | H04N 21/44227 715/771 |

FOREIGN PATENT DOCUMENTS

| | | |
|---|---|---|
| CN | 101253467 | 8/2008 |
| CN | 101453469 | 6/2009 |
| CN | 101866996 | 10/2010 |
| CN | 101981522 | 2/2011 |
| EP | 1 492 378 | 12/2004 |
| EP | 2 117 255 | 11/2009 |
| JP | 2003-284161 | 10/2003 |
| JP | 2004-096234 | 3/2004 |
| JP | 2004-235962 | 8/2004 |
| JP | 2005-310022 | 11/2005 |
| JP | 2006-106974 | 4/2006 |
| JP | 2006-350819 | 12/2006 |
| JP | 2007-096571 | 4/2007 |
| JP | 2007-119109 | 5/2007 |
| JP | 2009-182771 | 8/2009 |
| JP | 2009-206985 | 9/2009 |
| JP | 2009-212963 | 9/2009 |
| JP | 2010-206786 | 9/2010 |
| KR | 1020070011086 | 1/2007 |
| KR | 1020090025260 | 3/2009 |
| KR | 1020090102299 | 9/2009 |
| KR | 1020100122027 | 11/2010 |

OTHER PUBLICATIONS

Control 4 home automation system available at http://www.control4.com/residential/solutions/ as of Nov. 2011 (Year: 2011).*
Japanese Office Action dated Aug. 13, 2018 issued in counterpart application No. 2017-165959, 11 pages.
Russian Office Action dated Aug. 13, 2018 issued in counterpart application No. 2017132841/08, 15 pages.
Russian Office Action dated May 23, 2017 issued in counterpart application No. 2014126405/08, 15 pages.
Chinese Office Action dated Mar. 2, 2016 issued in counterpart application No. 201280068435.9, 29 pages.
Korean Office Action dated Mar. 9, 2016 issued in counterpart application No. 10-2012-0077921, 9 pages.
European Search Report dated Jan. 18, 2017 issued in counterpart application No. 12854028.3-1879, 6 pages.
Yun-Jae Jang et al., "A Home Automation System based on Smart Phone", The Journal of Korea Information and Communications Society, vol. 6, No. 4, Aug. 12, 2011.
Jihye Choi et al., "Designing User Interface for Smart Home Server System", The Korean Institute of Information Scientists and Engineers, vol. 38, No. 1, Jun. 8, 2011.
European Search Report dated Jul. 6, 2015 issued in counterpart application No. 12854028.3-1959, 8 pages.
Australian Examination Report dated Aug. 11, 2015 issued in counterpart application No. 2012327198, 3 pages.

(56) References Cited

OTHER PUBLICATIONS

Korean Office Action dated Sep. 8, 2016 issued in counterpart application No. 10-2012-0077921, 8 pages.
Japanese Office Action dated Nov. 21, 2016 issued in counterpart application No. 2014-544652, 11 pages.
Philippe Debaty , A Toolkit to Design Adaptable User Interfaces in Ubiquitous Computing Environments, 2004 IEEE.
Jeffrey Nichols, Automatically Generating User Interfaces for Applicances, Carnegie Mellon University, 2004.
Japanese Office Action dated Dec. 17, 2018 issued in counterpart application No. 2017-165959, 5 pages.
European Search Report dated Dec. 8, 2017 issued in counterpart application No. 12854028.3-1879, 7 pages.
Brazilian Office Action dated Dec. 2, 2019 issued in counterpart application No. 112014012962-2, 8 pages.
European Search Report dated Jan. 3, 2020 issued in counterpart application No. 12854028.3-1221, 14 pages.
Chinese Office Action dated Dec. 14, 2020 issued in counterpart application No. 201710723412.1, 9 pages.
Chinese Office Action dated Jun. 7, 2021 issued in counterpart application No. 201710723412.1, 21 pages.
Canadian Office Action dated Mar. 10, 2020 issued in counterpart application No. 2,857,266, 3 pages.
Chinese Office Action dated May 15, 2020 issued in counterpart application No. 201710723412.1, 23 pages.
Chinese Office Action dated Nov. 3, 2021 issued in counterpart application No. 201710723412.1, 21 pages.

\* cited by examiner

FIG. 7

| DAYS | TIME | CONTROLLED DEVICES | CONTROL FUNCTIONS | NUMBERS |
|---|---|---|---|---|
| MONDAY | 9:00~9:30 | TV | VOL+ | 10 |
| | | | VOL- | 9 |
| | | | CH+ | 5 |
| | | | CH- | 3 |
| MONDAY | 9:00~9:30 | LIGHTING DEVICE | BRIGHTNESS + | 5 |
| | | | BRIGHTNESS - | 4 |
| | | | ON/OFF | 9 |
| MONDAY | 9:00~9:30 | AIR CONDITIONER | COOL | 7 |
| | | | HEAT | 5 |
| | | | AUTO | 5 |
| TUESDAY | 15:00~17:00 | RADIO | ON/OFF | 5 |
| | | | VOL+ | 7 |
| | | | VOL- | 6 |
| ... | ... | ... | ... | ... |

FIG. 8

| DAYS | TIME | CONTROLLED DEVICES |
|---|---|---|
| MONDAY | 9:00~9:30 | TV, LIGHTING DEVICE, AIR CONDITIONER |
| TUESDAY | 15:00~17:00 | RADIO, CLEANER |
| ... | ... | ... |

METHOD AND SYSTEM FOR PROVIDING USER INTERFACE FOR DEVICE CONTROL

PRIORITY

This application is a continuation of, and claims priority under 35 U.S.C. § 120 to, U.S. patent application Ser. No. 13/689,203, which was filed on Nov. 29, 2012 in the U.S. Patent and Trademark Office, issued on Apr. 11, 2017 as U.S. Pat. No. 9,621,369, and claimed priority under 35 U.S.C. § 119(a) to Korean Patent Application Nos. 10-2011-0126277 and No. 10-2012-77921, which were filed on Nov. 29, 2011 and Jul. 17, 2012, respectively, in the Korean Intellectual Property Office, the entire disclosures of all of which are incorporated herein by reference.

BACKGROUND OF THE INVENTION

1. Field of the Invention

The present invention relates generally to a method and system for providing a User Interface (UI) for device control, and more particularly, to a method and system for providing a UI for device control based on a history of a device controlled by a user.

2. Description of the Related Art

A home network is a network technology for freely using electronic devices such as information electronic appliances deployed in the home by linking electronic devices over a network irrespective of time and place. The home network is a technology that makes life more convenient by linking information electronic appliances deployed in the home over the network.

Although a User Interface (UI) is provided to control appliances deployed in the home in a home network environment, it is difficult to efficiently control a specific function of a specific apparatus through a general UI. Furthermore, a UI capable of effectively controlling a plurality of apparatuses is required in the home network environment.

SUMMARY OF THE INVENTION

Accordingly, the present invention has been made to solve the above-stated problems occurring in the prior art, and provide at least the advantages described below.

An aspect of the present invention is to provide a User Interface (UI) providing method and system for device control, capable of generating and providing a UI relating to a function provided by at least one controlled device relating to an activity mode selected by a user.

Another aspect of the present invention is to provide a UI providing method and system for device control, capable of generating and providing a UI by analyzing a pattern of a controlled device controlled by a user.

Another aspect of the present invention is to provide a UI providing method and system for device control, capable of generating and providing a UI by combining frequently used functions of a plurality of controlled devices.

Another aspect of the present invention is to provide a UI providing method and system for device control, capable of generating and providing a UI for controlling controlled devices used together among a plurality of controlled devices.

According to an aspect of the present invention, a User Interface (UI) providing method is provided, which includes identifying at least one controlled devices relating to an activity mode selected by a user; collecting control information relating to functions provided by the identified at least one controlled devices; and generating a UI used to control the at least one controlled devices relating to the activity mode based on the collected control information.

According to another aspect of the present invention, a UI-providing apparatus is provided, which includes an identification unit for identifying at least one controlled devices relating to an activity mode selected by a user; a control information collection unit for collecting control information relating to functions provided by the identified at least one controlled devices; and a UI generation unit for generating a UI used to control the at least one controlled devices relating to the activity mode based on the collected control information.

According to another aspect of the present invention, a method of providing a UI-providing apparatus with information used to generate a UI for device control by using a server is provided. The method includes receiving control information regarding controlled devices relating to an activity mode selected by a user from the UI-providing apparatus; recommending functions of the controlled devices to be included in the UI to the UI-providing apparatus based on the received control information; wherein the recommended functions are used to generate the UI for controlling the controlled devices in the UI-providing apparatus.

According to another aspect of the present invention, a non-transitory computer-readable recording medium having recorded thereon a computer program for executing a User Interface (UI) providing method is provided.

According to another aspect of the present invention, a non-transitory computer-readable recording medium having recorded thereon a computer program for executing a method of providing a UI-providing apparatus with information used to generate a UI for device control by using a server is provided.

BRIEF DESCRIPTION OF THE DRAWINGS

The above and other aspects, features, and advantages of the present invention will become more apparent by describing in detail embodiments thereof with reference to the attached drawings in which:

FIG. 7 illustrates a control information table according to an embodiment of the present invention;

FIG. 8 illustrates a control information table according to another embodiment of the present invention;

DETAILED DESCRIPTION OF EMBODIMENTS OF THE PRESENT INVENTION

Figure 1:
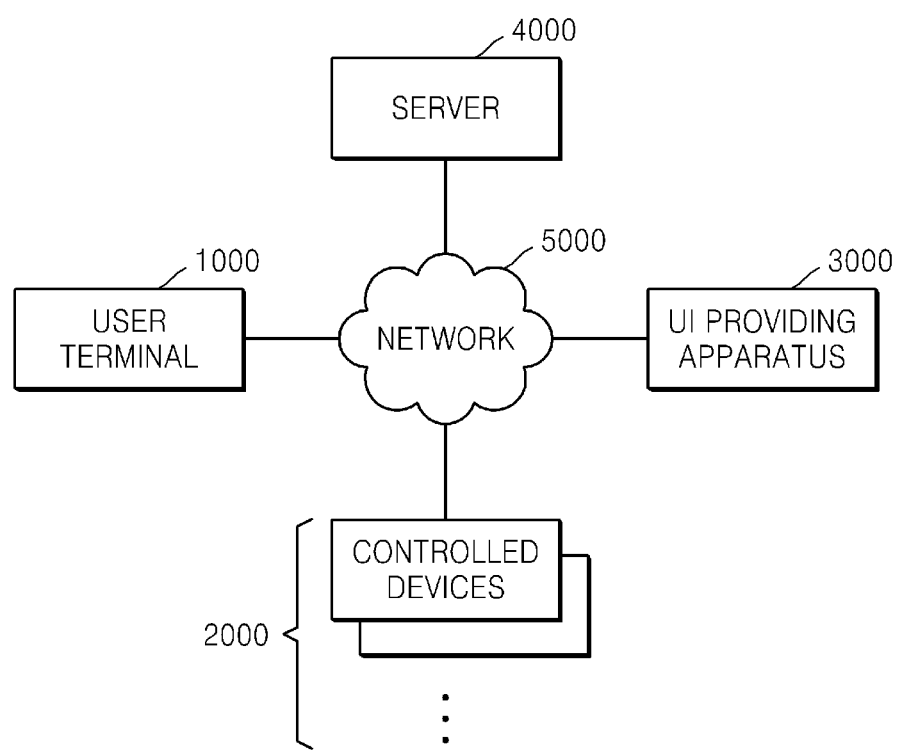
FIG. 1 illustrates a system for providing a user interface (UI) for device control according to an embodiment of the present invention.

Hereinafter, various embodiments of the present invention will be described with reference to the accompanying drawings. Throughout the drawings, the same elements will be designated by the same reference numerals.

In a User Interface (UI) providing a system for device control according to an embodiment of the present invention, a user terminal controls the operations of a plurality of controlled devices, a UI-providing apparatus collects control information regarding the device control and combines predetermined controlled devices and predetermined functions to control the predetermined controlled devices using the collected control information to generate a UI.

FIG. 1 illustrates a system for providing a user interface (UI) for device control according to an embodiment of the present invention.

Referring to FIG. 1, the system for providing the UI for device control according to an embodiment of the present invention includes a user terminal 1000, at least one controlled device 2000, a UI-providing apparatus 3000, a server 4000, and a network 5000.

The user terminal 1000 controls operations of the controlled devices 2000. The user terminal 1000 controls the controlled devices 2000 directly or through the UI-providing apparatus 3000, and provides the UI-providing apparatus 3000 with control information regarding the controlled devices 2000. The user terminal 1000 includes all types of apparatuses capable of communicating over wired and/or wireless networks and controlling the controlled devices 2000 through a display screen. The user terminal 1000 includes communication terminals, for example, a cellular phone, a smart phone, a Personal Digital Assistant (PDA) phone, a notebook, and a Personal Computer (PC).

The controlled devices 2000 receive a control command from the user terminal 1000 and operate according to the control command. The controlled devices 2000 also provide the UI-providing apparatus 3000 with control information relating to an operation based on the control command. The controlled devices 2000 include all apparatuses capable of communicating with the UI-providing apparatus 3000 over the wired/wireless networks, for example, a TV, a refrigerator, an audio system, an air conditioner, and a lighting device.

The UI-providing apparatus 3000 collects the control information regarding the controlled devices 2000 and generates the UI based on the collected control information. The UI-providing apparatus 3000 collects the control information from at least one of the user terminal 1000 and the controlled devices 2000. The UI-providing apparatus 3000 also provides the server 4000, which will be described below, with the collected control information and receive a recommendation of controlled devices to be controlled and control functions of the controlled devices from the server 4000. For example, the UI-providing apparatus 3000 receives a recommendation of controlled devices used together and frequently used functions at a predetermined time from the server 4000. The UI-providing apparatus 3000 generates and provides the UI based on the recommended controlled devices and control functions.

The server 4000 recommends the controlled devices and control functions to be controlled to the UI-providing apparatus 3000. The server 4000 receives the control information from the UI-providing apparatus 3000, analyzes the received control information, and recommends the controlled devices and the control functions.

The network 5000 includes a dedicated line, a Local Area Network (LAN), a Value-Added Network (VAN), Intranet, a private telephone network, a public telephone network, a Private Switched Telephone Network (PSTN), and a combination of these, is a data communication network in which the elements shown in FIG. 1 can readily communicate each other, and includes a wired Internet, a wireless Internet, and a mobile wireless communications network.

The system for providing the UI for device control according to an embodiment of the present invention is formed by a home network, and the UI-providing apparatus 3000 is included in a home gateway of the home network but the present invention is not limited thereto.

The UI-providing apparatus 3000 according to an embodiment of the present invention will now be described with reference to FIG. 2 below.

Figure 2:
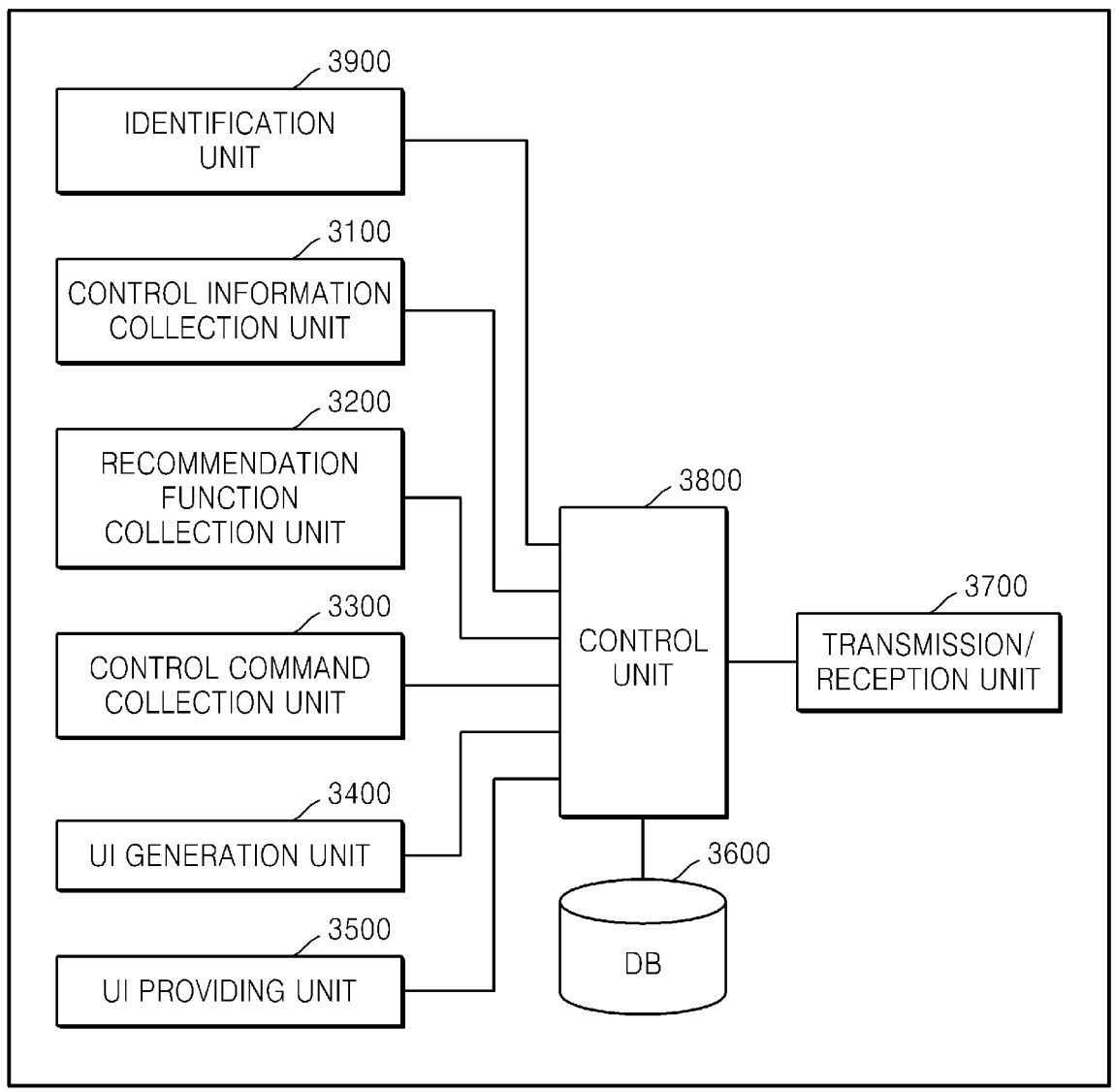
FIG. 2 is a detailed block diagram illustrating a UI-providing apparatus according to an embodiment of the present invention.

FIG. 2 is a detailed block diagram of the UI-providing apparatus 3000 according to an embodiment of the present invention.

Referring to FIG. 2, the UI-providing apparatus 3000 according to the present embodiment includes an identification unit 3900, a control information collection unit 3100, a recommendation function collection unit 3200, a control command collection unit 3300, a UI generation unit 3400, a UI-providing unit 3500, a DB 3600, a transmission/reception unit 3700, and a control unit 3800.

The identification unit 3900 identifies the at least one controlled device 2000 relating to an activity mode selected by a user. The activity mode may include, for example, a movie mode, a music listening mode, a cleaning mode, a vacation mode, and a sleeping mode. A variety of UIs may be generated according to the activity mode.

The identification unit 3900 may also select the activity mode based on a user input with respect to the UI-providing apparatus 3000. In this case, the UI-providing apparatus 3000 may display a list of activity modes. The identification unit 3900 may also receive information regarding the activity mode selected from the user terminal 1000. In this case, the user terminal 1000 may display the list of activity modes and provide the UI-providing apparatus 3000 with information regarding the activity mode selected based on the user input.

A list of controlled devices matching the activity mode may be also stored in the DB 3600 that will be described later. The identification unit 3900 may identify controlled devices relating to the activity mode based on the list of controlled devices. For example, an air conditioner, a lighting device, and a TV may match with respect to the movie mode. Further, if the user selects the movie mode as the activity mode, the identification unit 3900 may identify the air conditioner, the lighting device, and the TV as the controlled devices 2000.

The control information collection unit 3100 collects control information regarding the controlled devices 2000. The control information, which is information regarding an operation of the controlled device 2000 controlled according to a control command, may include information regarding a use history of a control device, and information regarding, for example, controlled time, controlled devices, control functions, and control numbers.

The control information collection unit 3100 also collects the control information from at least one of the user terminal 1000 and the controlled devices 2000. If the user terminal 1000 controls the controlled devices 2000 through the UI-providing apparatus 3000, the control information collection unit 3100 collects the control information from the user terminal 1000 based on a control command provided for device control. If the user terminal 1000 directly controls the controlled devices 2000, the control information collection unit 3100 collects control information regarding controlled operations from the controlled devices 2000. However, the present invention is not limited thereto. The control information collection unit 3100 collects the control information regarding the controlled devices 2000 from a separate server in which the control information regarding the controlled devices 2000 is stored. The control information collection unit 3100 may also collect the control information from at least one of an internal database of the UI-providing apparatus 3000, an external database connected to the UI-providing apparatus 3000, and the controlled devices 2000.

The recommendation function collection unit 3200 collects information regarding recommended control functions from the server 4000 based on the control information. The recommendation function collection unit 3200 provides the server 4000 with the collected control information and the information regarding the selected activity mode, and receives information regarding recommended controlled devices and control functions of the recommended controlled devices based on at least one of the control information and the activity mode from the server 4000. For example, the recommendation function collection unit 3200 provides the server 4000 with various types of control information regarding a TeleVision (TV), a radio, a lighting device, an air conditioner, and a washing machine, and receives a recommendation of the TV and the air conditioner as controlled devices from the server 4000 and of a function of adjusting the volume of the TV and a function of adjusting the temperature of the air conditioner as control functions. In this case, the server 4000 may recommend the controlled devices 2000 and functions that are used at a value higher than a value previously set by a user based on the use history of the control device.

The recommendation function collection unit 3200 may also provide the user terminal 1000 with the information relating to the controlled device and the control function recommended from the server 4000, and determine a controlled device and a control function that are to be included in a UI based on a user input through the user terminal 1000. For example, if feedback information used to include the recommended controlled device and control function in the UI is received from the user terminal 1000, the recommendation function collection unit 3200 may determine the recommended controlled device and control function to be included in the UI. Also, for example, if feedback information used not to include the recommended controlled device and control function in the UI is received from the user terminal 1000, the recommendation function collection unit 3200 may additionally request the server 4000 to recommend controlled device and control function.

The control command collection unit 3300 collects control commands corresponding to the recommended control functions. The control command collection unit 3300 requests the control commands corresponding to the recommended control functions from the controlled devices 2000, and receive information regarding the control commands from the controlled devices 2000. For example, if the function of adjusting the volume of the TV and the function of adjusting the temperature of the air conditioner are recommended, the control command collection unit 3300 requests a control command to adjust the volume from the TV and a control command to adjust the temperature from the air conditioner.

However, the present invention is not limited thereto. The control command collection unit 3300 previously collects control commands relating to the operations of the controlled devices 2000. The control command collection unit 3300 collects information regarding the control commands from the controlled devices 2000 or collects information regarding the control commands relating to the operations of the controlled devices 2000 from a separate server.

The UI generation unit 3400 generates a UI used to control the controlled devices 2000 based on the recommended control functions and the collected control commands. The UI generation unit 3400 generates the UI capable of controlling the controlled devices 2000 together that are recommended by the server 4000. For example, if the server 4000 recommends the TV and the air conditioner as controlled devices, the UI generation unit 3400 generates a UI having both the function of adjusting the volume of the TV and the function of adjusting the temperature of the air conditioner.

The UI generation unit 3400 also previously determines the layout of the UI, and allocates buttons of the UI to control functions of the controlled devices 2000, respectively. Accordingly, a user is able to easily control a plurality of controlled devices using UIs having the same layout.

The UI generation unit 3400 may also generate or change the UI based on a device control history of the user. For example, the UI generation unit 3400 may emphasize or add an icon for controlling a function frequently used by the user. Further, for example, the UI generation unit 3400 may delete an icon for controlling a function that is not frequently used by the user. Further, for example, the UI generation unit 3400 may change locations of icons for controlling functions of controlled devices. However, the present invention is not limited thereto.

The UI-providing unit 3500 provides the user terminal 1000 with the generated UI. The UI provided by the UI-providing unit 3500 is displayed on a screen of the user terminal 1000. The controlled devices 2000 is controlled based on a user input into the UI displayed on the screen of the user terminal 1000.

The DB 3600 stores various types of information necessary for generating the UI. The DB 3600 stores information regarding various control operations of the controlled devices 2000, which will be described in more detail with reference to FIGS. 7 and 8 later.

The transmission/reception unit 3700 transmits and receives various types of information necessary for generating the UI to and from the user terminal 1000 and the server 4000.

The control unit 3800 controls the overall operation of the UI-providing apparatus 3000, and controls the control information collection unit 3100, the recommendation function collection unit 3200, the control command collection unit 3300, the UI generation unit 3400, the UI-providing unit 3500, the DB 3600, and the transmission/reception unit 3700 such that the UI-providing apparatus 3000 can generate and provide the UI based on the control information.

The recommendation function collection unit 3200 provides the user terminal 1000 with the information regarding the control functions recommended by the server 4000. The user terminal 1000 generates the UI used to control the controlled devices 2000 by utilizing the information regarding the control functions. However, the present invention is not limited thereto. The user terminal 1000 receives the information regarding the recommended control functions from the server 4000.

The control command collection unit 3300 provides the user terminal 1000 with the collected control commands. The user terminal 1000 generates the UI used to control the controlled devices 2000 by using the provided control commands.

A method of generating the UI by utilizing the information provided by the UI-providing apparatus 3000 and the server 4000 in the user terminal 1000 will be described in more detail with reference to FIGS. 10 and 11.

The server 4000 according to an embodiment of the present invention will now be described with reference to FIG. 3 below.

Figure 3:
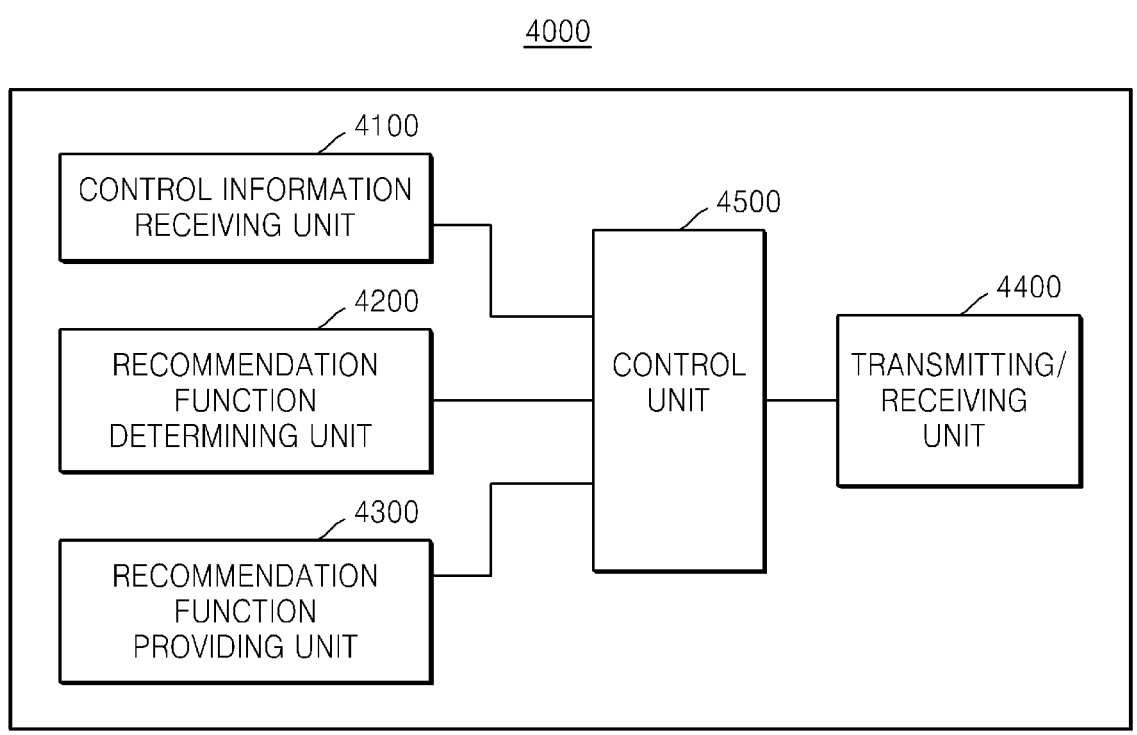
FIG. 3 is a detailed block diagram illustrating a server according to an embodiment of the present invention.

FIG. 3 is a detailed block diagram illustrating the server 4000 according to an embodiment of the present invention.

Referring to FIG. 3, the server 4000 according to the present embodiment includes a control information-receiving unit 4100, a recommendation function-determining unit 4200, a recommendation function-providing unit 4300, a transmitting/receiving unit 4400, and a control unit 4500.

The control information-receiving unit 4100 receives control information from the UI-providing apparatus 3000. The control information, which is information regarding operations of the controlled devices 2000 controlled according to a control command, includes information regarding, for example, controlled time, controlled devices, control functions, and control numbers. The control information-receiving unit 4100 also collects the control information from at least one of the user terminal 1000 and the controlled devices 2000. The user terminal 1000 and the controlled devices 2000 are directly connected to the server 4000 over the network 5000.

The recommendation function-determining unit 4200 determines the controlled devices 2000 and the control functions that are control targets based on the control information. The recommendation function-determining unit 4200 analyzes a device control pattern of a user based on the control information, and determines recommendation functions based on the analyzed device control pattern. The recommendation function-determining unit 4200 determines the recommendation functions by days or time by analyzing the control information. For example, the recommendation function-determining unit 4200 recommends devices and functions that are controlled at a value higher than a previously set value from among the controlled devices 2000 and control functions controlled on Monday at 9:00-9:30.

The recommendation function-determining unit 4200 determines the recommendation functions from control information by analyzing the controlled devices 2000 and control functions together controlled by the user. For example, if a number for together controlling a TV, an air conditioner, and a lighting device exceeds a previously set value, the recommendation function-determining unit 4200 recommends controlled devices and control functions to generate a UI capable of together controlling a function of adjusting the volume of the TV, a function of adjusting the temperature of the air conditioner, and a function of adjusting the brightness of the lighting device.

The recommendation function-determining unit 4200 may also receive information regarding an activity mode selected by the user from the UI-providing apparatus 3000 and recommend controlled devices corresponding to the activity mode. However, the present invention is not limited thereto. The user terminal 1000 may identify controlled devices corresponding to the activity mode selected by the user and provide the server 4000 with information regarding the identified controlled devices. The recommendation function-determining unit 4200 may recommend predetermined controlled devices and control functions based on the information regarding the identified controlled devices.

The recommendation function-determining unit 4200 also recommends devices and functions to be controlled based on controlled devices and control functions that are currently controlled by the user terminal 1000.

The recommendation function-providing unit 4300 provides the UI-providing apparatus 3000 with the determined recommendation functions. The provided recommendation functions are used to generate a UI for device control by the UI-providing apparatus 3000.

The transmitting/receiving unit 4400 transmits and receives various types of information necessary for recommending control functions used to generate the UI to and from the user terminal 1000, the controlled devices 2000, and the UI-providing apparatus 3000.

The control unit 4500 controls the overall operation of the server 4000, and controls the control information-receiving unit 4100, the recommendation function-determining unit 4200, the recommendation function-providing unit 4300, and the transmitting/receiving unit 4400 in such a way that the server 4000 can recommend control functions used to generate the UI.

The recommendation function-providing unit 4300 provides the user terminal 1000 with information regarding the determined recommendation functions, and the user terminal 1000 generates the UI used to control the controlled devices 2000 by using the information regarding the recommendation functions.

A UI providing method for device control according to an embodiment of the present invention will now be described with reference to FIG. 4.

Figure 4:
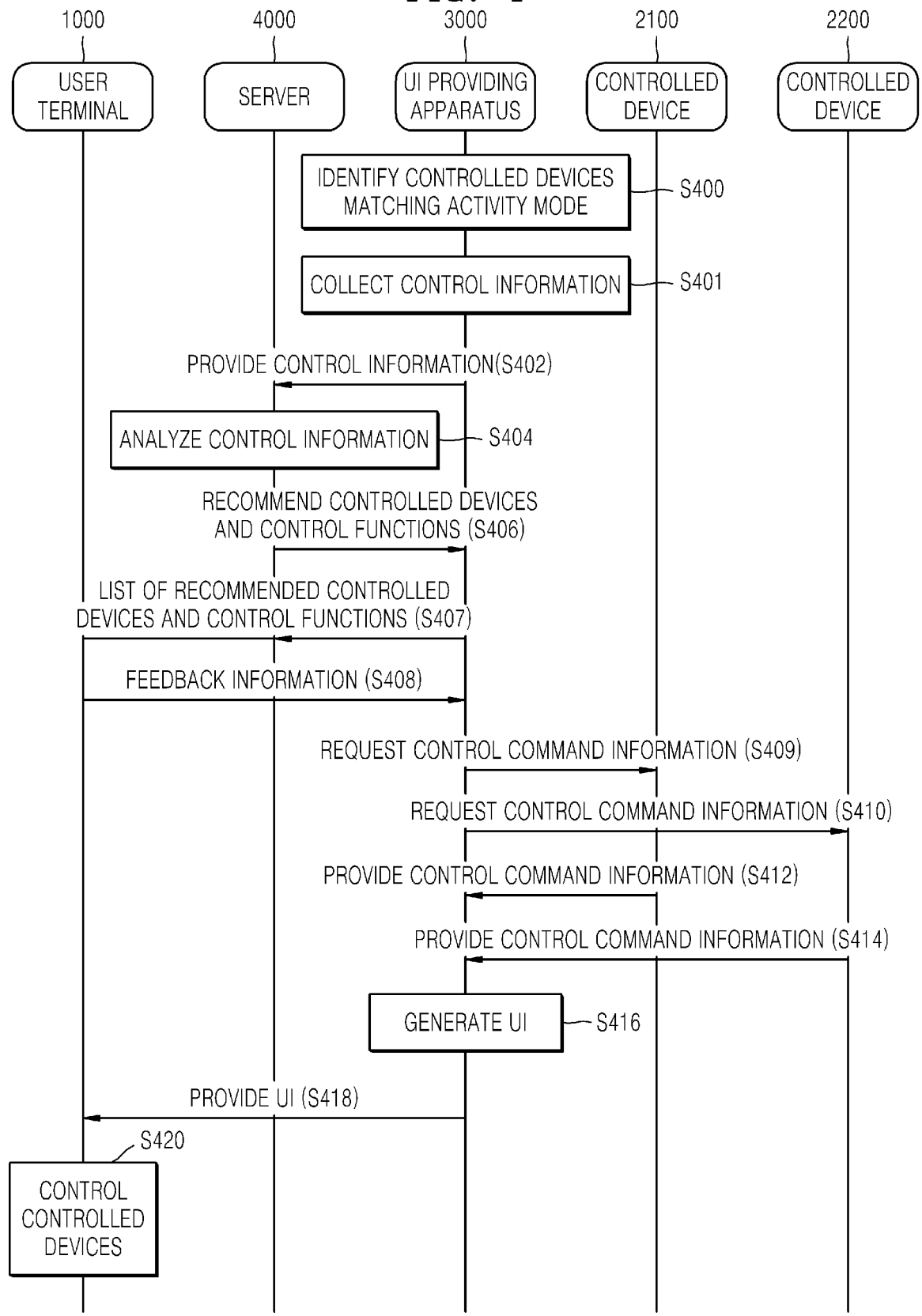
FIG. 4 is a detailed block flow diagram illustrating a UI providing method for device control according to an embodiment of the present invention.

FIG. 4 is a detailed block flow diagram of a UI providing method for device control according to an embodiment of the present invention.

Referring to FIG. 4, in step S400, the UI-providing apparatus 3000 identifies controlled devices matching an activity mode. The UI-providing apparatus 3000 may identify the at least one controlled device 2000 relating to the activity mode selected by a user in step S400.

The UI-providing apparatus 3000 may also select the activity mode based on a user input with respect to the UI-providing apparatus 3000. In this case, the UI-providing apparatus 3000 may display a list of activity modes. The UI-providing apparatus 3000 may also receive information regarding the selected activity mode. The UI-providing apparatus 3000 may receive information regarding the selected activity mode from the user terminal 1000. In this case, the user terminal 1000 may display the list of activity modes and provide the UI-providing apparatus 3000 with the information regarding the activity mode selected based on the user input.

A list of controlled devices matching the activity mode may be stored in the DB 3600. The UI-providing apparatus 3000 may identify the controlled devices relating to the activity mode based on the list of the controlled devices. For example, an air conditioner, a lighting device, and a TV may match with respect to a movie mode. Further, if the user selects the movie mode as the activity mode, the UI-providing apparatus 3000 may identify the air conditioner, the lighting device, and the TV as the controlled devices 2000.

In step S401, the UI-providing apparatus 3000 collects control information regarding the identified controlled devices. The UI-providing apparatus 3000 collects the control information from at least one of the user terminal 1000 and controlled devices 2100 and 2200 in step S401. If the user terminal 1000 controls the controlled devices 2100 and 2200 through the UI-providing apparatus 3000, the UI-providing apparatus 3000 collects the control information based on a control command provided by the user terminal 1000. If the user terminal 1000 directly controls the controlled devices 2100 and 2200, the UI-providing apparatus 3000 receives control information regarding controlled operations from the controlled devices 2100 and 2200. However, the present invention is not limited thereto. The UI-providing apparatus 3000 collects control information regarding the controlled devices 2100 and 2200 from a separate server in which the control information regarding the controlled devices 2100 and 2200 is stored.

In step S402, the UI-providing apparatus 3000 provides the server 4000 with the collected control information. Although the server 4000 receives the control information from the UI-providing apparatus 3000 in step S402, the present invention is not limited thereto. The server 4000 receives the control information from the user terminal 1000 or the controlled devices 2100 and 2200. In this case, the user terminal 1000 and the controlled devices 2100 and 2200 are directly connected to the server 4000 over the network 5000.

In step S404, the server 4000 analyzes the control information. The server 4000 analyzes a user control history and a device control pattern of a user based on the received control information in step S404. For example, the server 4000 determines controlled devices that are controlled at a value higher than a previously set value by time or days. The server 4000 determines control functions of respective controlled devices that are controlled at a value higher than a previously set value by time or days.

The server 4000 determines controlled devices together controlled at a value higher than a previously set value and determine information regarding control functions together controlled at a value higher than a previously set value in step S404.

In step S406, the server 4000 recommends controlled devices and control functions to the UI-providing apparatus 3000. The server 4000 recommends controlled devices and control functions by days or time in step S406. For example, the server 400 recommends devices and functions that are controlled at a value higher than a previously set value from among the controlled devices 2100 and 2200 and control functions controlled on Monday at 9:00-9:30.

The server 4000 also recommends controlled devices 2100 and 2200 and control functions by devices in step S406. For example, if a number for simultaneously controlling a TV, an air conditioner, and a lighting device exceeds a previously set value, the server 4000 recommends controlled devices and control functions so as to generate a UI capable of together controlling a function of adjusting the volume of the TV, a function of adjusting the temperature of the air conditioner, and a function of adjusting the brightness of the lighting device.

The server 4000 also recommends devices and functions to be controlled based on controlled devices and control functions that are currently controlled by the user terminal 1000 in step S406.

In step S407, the UI-providing apparatus 3000 provides the user terminal 1000 with a list of the recommended controlled devices and control functions.

In step S408, the user terminal 1000 provides the UI-providing apparatus 3000 with feedback information of the user regarding the list of the recommended controlled devices and control functions. For example, the user terminal 1000 may provide the UI-providing apparatus 3000 with the feedback information used to include the recommended controlled devices and control functions in an UI. In this case, the UI-providing apparatus 3000 may determine the recommended controlled devices and control functions to be included in the UI. Also, for example, if the user terminal 1000 may provide the UI-providing apparatus 3000 with the feedback information used not to include the recommended controlled devices and control functions in the UI, the UI-providing apparatus 3000 may additionally request the server 4000 to recommend controlled devices and control functions.

In steps S409 and S410, the UI-providing apparatus 3000 requests control command information from the controlled devices 2100 and 2200 based on information regarding the recommended controlled devices and control functions.

In steps S412 and S414, the controlled devices 2100 and 2200 provide the UI-providing apparatus 3000 with the control command information.

Although the UI-providing apparatus 3000 receives the control command information from the controlled devices 2100 and 2200 in steps S409 through S414, the present invention is not limited thereto.

In step S416, the UI-providing apparatus 3000 generates an UI. The UI-providing apparatus 3000 generates the UI for controlling the controlled devices 2100 and 2200 based on the recommended control functions and the collected control command information in step S416. For example, if the server 4000 recommends the TV and the air conditioner as controlled devices to the UI-providing apparatus 3000, the UI-providing apparatus 3000 generates the UI including the function of adjusting the volume of the TV and the function of adjusting the temperature of the air conditioner.

The UI-providing apparatus 3000 previously determines a layout of the UI, and allocate control functions of the controlled devices 2100 and 2200 to buttons of the UI of the previously determined layout. Accordingly, the user can easily control a plurality of controlled devices using UIs of the same layout.

The UI-providing apparatus 3000 may also generate or change the UI based on the device control history of the user. For example, the UI-providing apparatus 3000 may emphasize or add an icon for controlling a function frequently used by the user. Further, for example, the UI generation unit 3400 may delete an icon for controlling a function that is not frequently used by the user. Further, for example, the UI-providing apparatus 3000 may change locations of icons for controlling functions of controlled devices. However, the present invention is not limited thereto.

In step S418, the UI-providing apparatus 3000 provides the user terminal 1000 with the generated UI. In step S420, the user terminal 1000 controls the controlled devices 2100 and 2200 based on the received UI.

The UI-providing apparatus 3000 according to another embodiment of the present invention will now be described with reference to FIG. 5.

Figure 5:
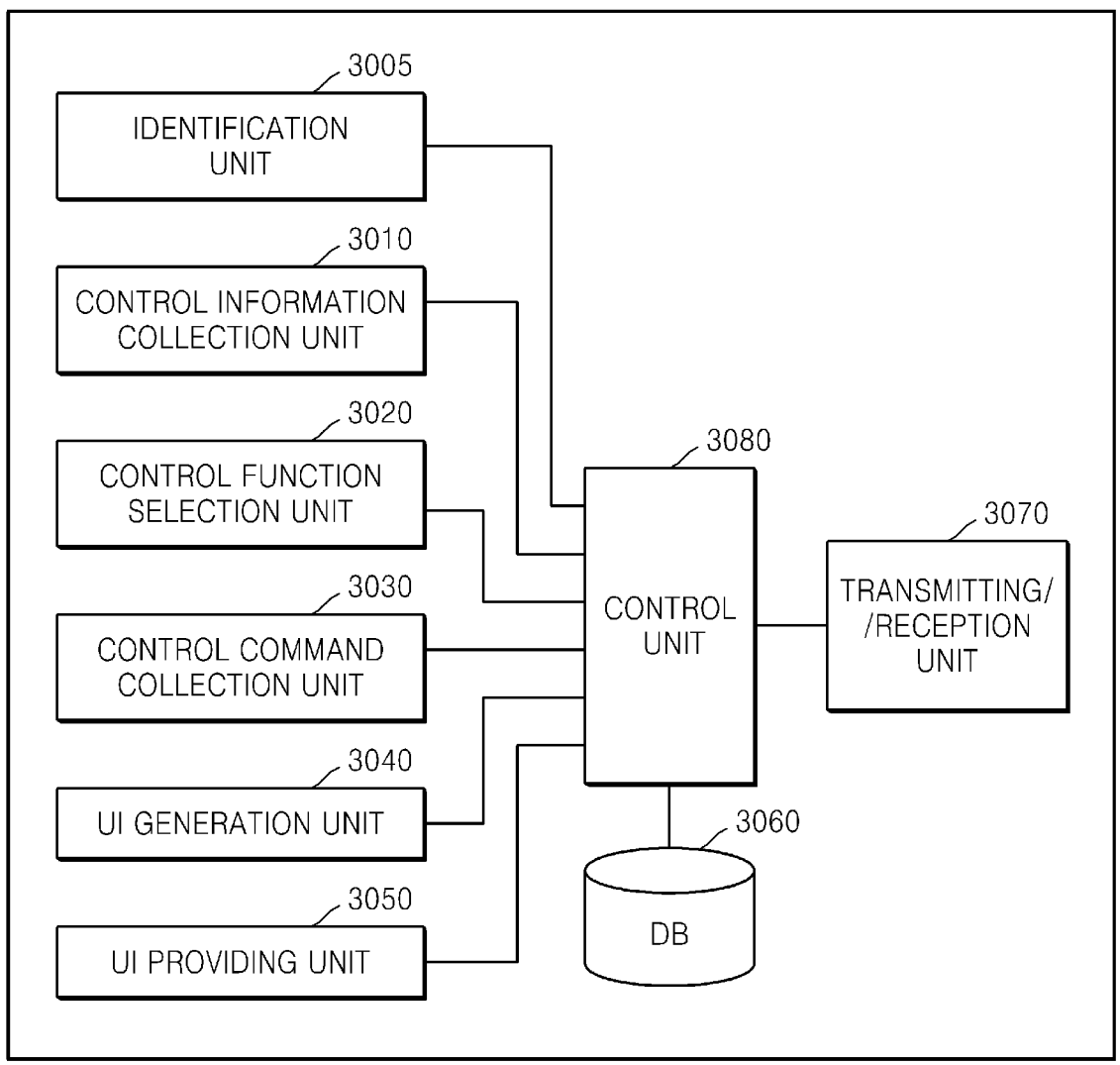
FIG. 5 is a detailed block diagram illustrating a UI-providing apparatus according to another embodiment of the present invention.

FIG. 5 is a detailed block diagram illustrating the UI-providing apparatus 3000 according to another embodiment of the present invention.

Referring to FIG. 5, the UI-providing apparatus 3000 according to the present embodiment includes an identification unit 3005, a control information collection unit 3010, a control function selection unit 3020, a control command collection unit 3030, a UI generation unit 3040, a UI-providing unit 3050, a DB 3060, a transmission/reception unit 3070, and a control unit 3080.

The identification unit 3005 identifies the at least one controlled device 2000 relating to an activity mode selected by a user. The activity mode may include, for example, a movie mode, a music listening mode, a cleaning mode, a vacation mode, and a sleeping mode. A variety of types of UIs may be generated according to the activity mode.

The identification unit 3005 may also select the activity mode based on a user input with respect to the UI-providing apparatus 3000. In this case, the UI-providing apparatus 3000 may display a list of activity modes. The identification unit 3005 may also receive information regarding the activity mode selected from the user terminal 1000. In this case, the user terminal 1000 may display the list of activity modes and provide the UI-providing apparatus 3000 with information regarding the activity mode selected based on the user input.

A list of controlled devices matching the activity mode may be also stored in the DB 3600. The identification unit 3005 may identify controlled devices relating to the activity mode based on the list of controlled devices. For example, an air conditioner, a lighting device, and a TV may match with respect to the movie mode. Further, if the user selects the movie mode as the activity mode, the identification unit 3005 may identify the air conditioner, the lighting device, and the TV as the controlled devices 2000.

The control information collection unit 3010 collects control information regarding the controlled devices 2000. The control information collection unit 3010 collects the control information from at least one of the user terminal 1000 and the controlled devices 2000. If the user terminal 1000 controls the controlled devices 2000 through the UI-providing apparatus 3000, the control information collection unit 3010 collects the control information from the user terminal 1000 based on a control command provided for device control. If the user terminal 1000 directly controls the controlled devices 2000, the control information collection unit 3010 collects control information regarding controlled operations from the controlled devices 2000. However, the present invention is not limited thereto. The control information collection unit 3010 collects the control information regarding the controlled devices 2000 from a separate server in which the control information regarding the controlled devices 2000 is stored.

The control function selection unit 3020 selects control functions to be included in a UI. The control function selection unit 3020 analyzes the device control pattern of a user based on the collected control information, and selects controlled devices and control functions that are control targets based on the analyzed device control pattern. The control function selection unit 3020 also selects the control functions by days or time by analyzing the control information. For example, the control function selection unit 3020 selects devices and functions that are controlled at a value higher than a previously set value from among controlled devices and control functions controlled on Monday at 9:00-9:30.

The control function selection unit 3020 also selects the control functions from controlled information by analyzing controlled devices and controls functions together controlled. For example, if a number for together controlling a TV, an air conditioner, and a lighting device exceeds a previously set value, the control function selection unit 3020 selects a function of adjusting the volume of the TV, a function of adjusting the temperature of the air conditioner, and a function of adjusting the brightness of the lighting device.

The control function selection unit 3020 also select controlled devices corresponding to the activity mode selected by the user. The control function selection unit 3020 also selects devices and functions to be controlled based on controlled devices and control functions that are currently controlled by the user terminal 1000.

The control function selection unit 3020 may also provide the user terminal 1000 with information regarding the selected controlled devices and control functions, and determine the controlled devices and control functions to be included in an UI based on a user input through the user terminal 1000. For example, if the control function selection unit 3020 receives feedback information used to include the recommended controlled devices and control functions in the UI from the user terminal 1000, the control function selection unit 3020 may determine the selected controlled devices and control functions to be included in the UI. Also, for example, if the control function selection unit 3020 receives the feedback information used not to include the recommended controlled devices and control functions in the UI, the control function selection unit 3020 may select the controlled devices and control functions again.

The control command collection unit 3030 collects control commands corresponding to the selected control functions. The control command collection unit 3030 requests the control commands corresponding to the selected control functions from the controlled devices 2000, and receive information regarding the control commands from the controlled devices 2000. For example, if the function of adjusting the volume of the TV and the function of adjusting the temperature of the air conditioner are selected, the control command collection unit 3030 requests a control command to adjust the volume from the TV and a control command to adjust the temperature from the air conditioner.

However, the present invention is not limited thereto. The control command collection unit 3030 previously collects control commands relating to the operations of the controlled devices 2000. The control command collection unit 3030 collects information regarding the control commands from the controlled devices 2000 or collect information regarding the control commands relating to the operations of the controlled devices 2000 from a separate server.

The UI generation unit 3040 generates a UI used to control the controlled devices 2000 based on the selected control functions and the collected control commands. The UI generation unit 3040 generates the UI capable of controlling the controlled devices 2000 together that are recommended by the server 4000. For example, if the server 4000 selects and recommends the TV and the air conditioner as controlled devices, the UI generation unit 3040 generates a UI including both the function of adjusting the volume of the TV and the function of adjusting the temperature of the air conditioner.

The UI generation unit 3040 also previously determines a layout of the UI, and allocates buttons of the UI including the previously determined layout to control functions of the controlled devices 2000. Accordingly, a user can easily control a plurality of controlled devices using UIs having the same layout.

The UI generation unit 3040 may also generate or change the UI based on a device control history of the user. For example, the UI generation unit 3040 may emphasize or add an icon for controlling a function frequently used by the user. Further, for example, the UI generation unit 3040 may delete an icon for controlling a function that is not frequently used by the user. Further, for example, the UI generation unit 3040 may change locations of icons for controlling functions of controlled devices. However, the present invention is not limited thereto.

The UI-providing unit 3050 provides the user terminal 1000 with the generated UI. The UI provided by the UI-providing unit 3050 is displayed on a screen of the user terminal 1000. The controlled devices 2000 is controlled based on a user input into the UI displayed on the screen of the user terminal 1000.

The DB 3060 stores various types of information necessary for generating the UI. The DB 3060 stores information regarding various control operations of the controlled devices 2000, which will be described in more detail with reference to FIGS. 7 and 8 later.

The transmission/reception unit 3070 transmits and receives various types of information necessary for generating the UI.

The control unit 3080 controls the overall operation of the UI-providing apparatus 3000, and controls the control information collection unit 3010, the control function selection unit 3020, the control command collection unit 3030, the UI generation unit 3040, the UI-providing unit 3050, the DB 3060, and the transmission/reception unit 3070 in such a way that the UI-providing apparatus 3000 can generate and provide the UI based on the control information.

Meanwhile, the control function selection unit 3020 provides the user terminal 1000 with information regarding the selected control functions. The control command collection unit 3030 provides the user terminal 1000 with the collected control commands. The user terminal 1000 generates the UI used to control the controlled devices 2000 by utilizing the received information regarding the selected control functions and control commands.

A UI providing method for device control according to another embodiment of the present invention will now be described with reference to FIG. 6.

Figure 6:
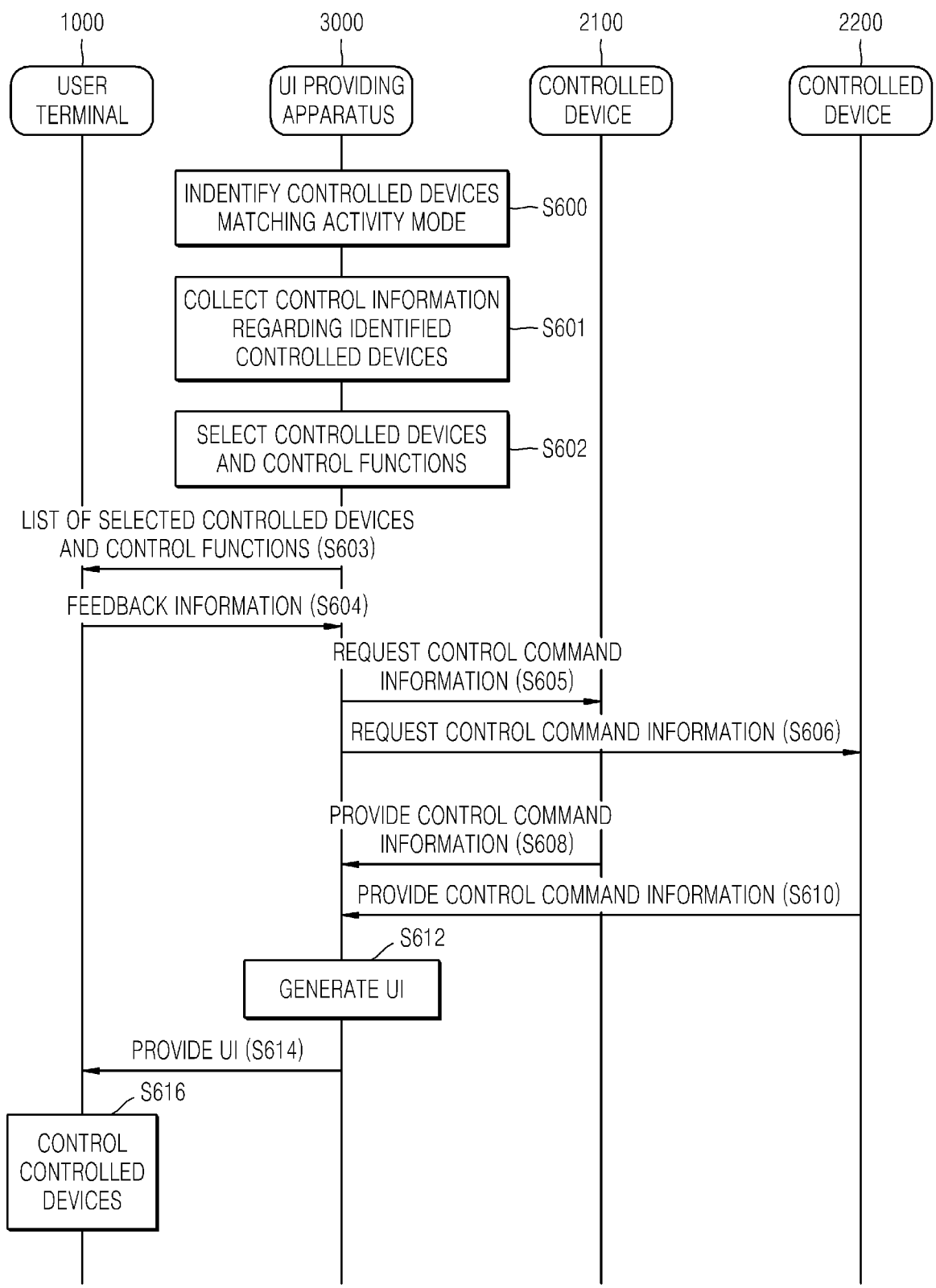
FIG. 6 is a detailed block flow diagram illustrating a UI providing method for device control according to another embodiment of the present invention.

FIG. 6 is a detailed block flow diagram illustrating a UI providing method for device control according to another embodiment of the present invention.

Referring to FIG. 6, in step S600, the UI-providing apparatus 3000 identifies controlled devices matching an activity mode. The UI-providing apparatus 3000 may identify the at least one controlled device 2000 relating to the activity mode selected by a user in step S600.

The UI-providing apparatus 3000 may also select the activity mode based on a user input with respect to the UI-providing apparatus 3000. In this case, the UI-providing apparatus 3000 may display a list of activity modes. The UI-providing apparatus 3000 may also receive information regarding the selected activity mode. The UI-providing apparatus 3000 may receive information regarding the selected activity mode from the user terminal 1000. In this case, the user terminal 1000 may display the list of activity modes and provide the UI-providing apparatus 3000 with the information regarding the activity mode selected based on the user input.

A list of controlled devices matching the activity mode may be stored in the DB 3060. The UI-providing apparatus 3000 may identify the controlled devices relating to the activity mode based on the list of the controlled devices. For example, an air conditioner, a lighting device, and a TV may match with respect to a movie mode. Further, if the user selects the movie mode as the activity mode, the UI-providing apparatus 3000 may identify the air conditioner, the lighting device, and the TV as the controlled devices 2000.

In step S601, the UI-providing apparatus 3000 collects control information regarding the identified controlled devices. The UI-providing apparatus 3000 collects the control information from at least one of the user terminal 1000 and controlled devices 2100 and 2200 in step S600. If the user terminal 1000 controls the controlled devices 2100 and 2200 through the UI-providing apparatus 3000, the UI-providing apparatus 3000 collects the control information based on a control command provided by the user terminal 1000. If the user terminal 1000 directly controls the controlled devices 2100 and 2200, the UI-providing apparatus 3000 receives control information regarding controlled operations from the controlled devices 2100 and 2200. However, the present invention is not limited thereto. The UI-providing apparatus 3000 collects control information regarding the controlled devices 2100 and 2200 from a separate server in which the control information regarding the controlled devices 2100 and 2200 is stored.

In step S602, the UI-providing apparatus 3000 selects control functions to be included in a UI. The UI-providing apparatus 3000 analyzes a device control history and a device control pattern of a user based on the collected control information, and select controlled devices and control functions that are control targets based on the analyzed device control history and device control pattern in step S602. The UI-providing apparatus 3000 also selects the control functions by days or time by analyzing the control information. For example, the UI-providing apparatus 3000 selects devices and functions that are controlled at a value higher than a previously set value from among controlled devices and control functions controlled on Monday at 9:00-9:30.

The UI-providing apparatus 3000 also selects the control functions from controlled information by analyzing controlled devices and control functions together controlled in step S602. For example, if a number for together controlling a TV, an air conditioner, and a lighting device exceeds a previously set value, the UI-providing apparatus 3000 selects a function of adjusting the volume of the TV, a function of adjusting the temperature of the air conditioner, and a function of adjusting the brightness of the lighting device.

The UI-providing apparatus 3000 also selects devices and functions to be controlled based on controlled devices and control functions that are currently controlled by the user terminal 1000 in step S602.

In step S603, the UI-providing apparatus 3000 provides the user terminal 1000 with a list of the selected controlled devices and control functions.

In step S604, the user terminal 1000 provides the UI-providing apparatus 3000 with feedback information of the user regarding the list of the recommended controlled devices and control functions. For example, the user terminal 1000 may provide the UI-providing apparatus 3000 with the feedback information used to include the recommended controlled devices and control functions in an UI. In this case, the UI-providing apparatus 3000 may determine the selected controlled devices and control functions to be included in the UI. Also, for example, the user terminal 1000 may provide the UI-providing apparatus 3000 with the feedback information used not to include the selected controlled devices and control functions in the UI. In this case, the UI-providing apparatus 3000 may select controlled devices and control functions again.

In steps S605 and S606, the UI-providing apparatus 3000 requests control command information from the controlled devices 2100 and 2200 based on information regarding the selected controlled devices and control functions.

In steps S608 and S610, the controlled devices 2100 and 2200 provide the UI-providing apparatus 3000 with the control command information.

Although the UI-providing apparatus 3000 receives the control command information from the controlled devices 2100 and 2200 in steps S605 through S610, the present invention is not limited thereto.

In step S612, the UI-providing apparatus 3000 generates an UI. The UI-providing apparatus 3000 generates the UI for controlling the controlled devices 2100 and 2200 based on the selected control functions and the collected control command information in step S612. For example, if the server 4000 selects the TV and the air conditioner as controlled devices, the UI-providing apparatus 3000 generates the UI including the function of adjusting the volume of the TV and the function of adjusting the temperature of the air conditioner.

The UI-providing apparatus 3000 previously determines a layout of the UI in step S612, and allocates control functions of the controlled devices 2100 and 2200 to buttons of the UI of the previously determined layout. Accordingly, the user can easily control a plurality of controlled devices using UIs of the same layout.

In step S612, the UI-providing apparatus 3000 may also generate or change the UI based on the device control history of the user. For example, the UI-providing apparatus 3000 may emphasize or add an icon for controlling a function frequently used by the user. Further, for example, the UI-providing apparatus 3000 may delete an icon for controlling a function that is not frequently used by the user. Further, for example, the UI-providing apparatus 3000 may change locations of icons for controlling functions of controlled devices. However, the present invention is not limited thereto.

In step S614, the UI-providing apparatus 3000 provides the user terminal 1000 with the generated UI. In step S616, the user terminal 1000 controls the controlled devices 2100 and 2200 based on the received UI.

Control information according to an embodiment of the present invention will now be described with reference to FIGS. 7 and 8.

FIG. 7 illustrates a control information table according to an embodiment of the present invention.

Referring to FIG. 7, the control information table according to the present embodiment includes a day field 70, a time field 72, a controlled device field 74, a control function field 76, and a number field 78.

Days on which controlled devices are controlled are stored in the day field 70. Time at which controlled devices are controlled is stored in the time field 72. Identification values of controlled devices are stored in the controlled device field 74. Control functions by controlled devices are stored in the control function field 76. Control numbers by control functions of controlled devices are stored in the number field 78.

Therefore, the server 4000 or the UI-providing apparatus 3000 analyzes a device control pattern of a user according to the control information table, and determines controlled devices and control functions that are to be included in a UI based on the analyzed device control pattern. For example, if the UI-providing apparatus 3000 generates an UI to be provided to the user terminal 1000 on Monday at 9:00-9:30, the UI-providing apparatus 3000 generates the UI capable of controlling a function of adjusting the volume of a TV, a function of turning a lighting device on/off, and a function of an air conditioner to cool air, that have many control numbers on Monday at 9:00-9:30.

FIG. 8 illustrates a control information table according to another embodiment of the present invention.

Referring to FIG. 8, the control information table according to the present embodiment includes a day field 80, a time field 82, and a controlled device field 84.

Days on which controlled devices are controlled are stored in the day field 80. Time at which controlled devices are controlled is stored in the time field 82. Identification values of controlled devices together controlled at the same time are stored in the controlled device field 84.

Therefore, the UI-providing apparatus 3000 determines controlled devices to be included in control targets of a UI according to the control information table. For example, if a radio is controlled, the UI-providing apparatus 3000 generates a UI capable of controlling the radio and a cleaner together.

A UI for device control according to an embodiment of the present invention will now be described with reference to FIG. 9.

Figure 9:
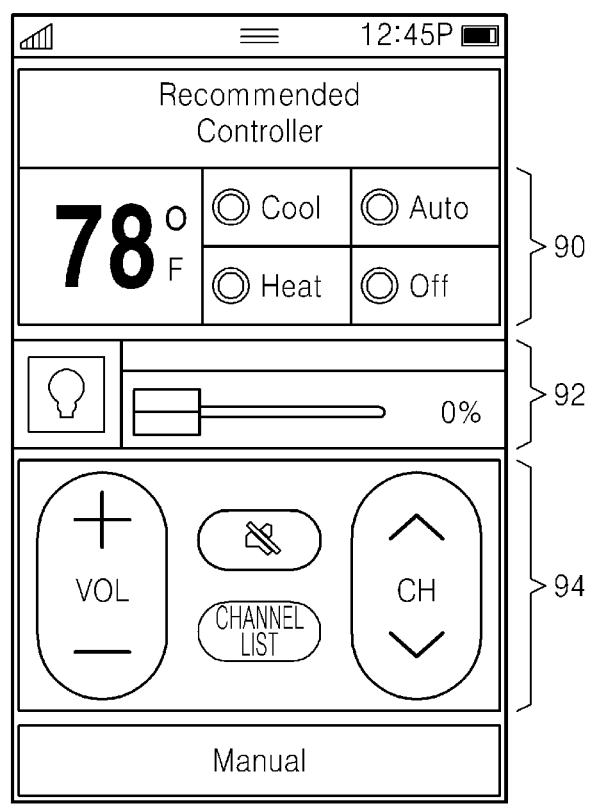
FIG. 9 illustrates a UI for device control according to an embodiment of the present invention.

FIG. 9 illustrates a UI for device control according to an embodiment of the present invention.

Referring to FIG. 9, the UI for device control according to the present embodiment includes a region 90 for controlling an air conditioner, a region 92 for controlling a lighting device, and a region 94 for controlling a TV.

A button "Cool" a button "Auto", a button "Heat", and a button "Off" are displayed on the region 90 for controlling the air conditioner. A button for adjusting brightness is displayed on region 92 for controlling the lighting device. A button for adjusting channels and a button of adjusting the volume are displayed on region 94 for controlling the TV.

A layout of the UI is previously determined. Control functions of controlled devices are allocated to respective buttons of UIs of previously determined layouts whenever the UIs are generated.

A method of generating a UI according to an embodiment of the present invention will now be described with reference to FIG. 10.

Figure 10:
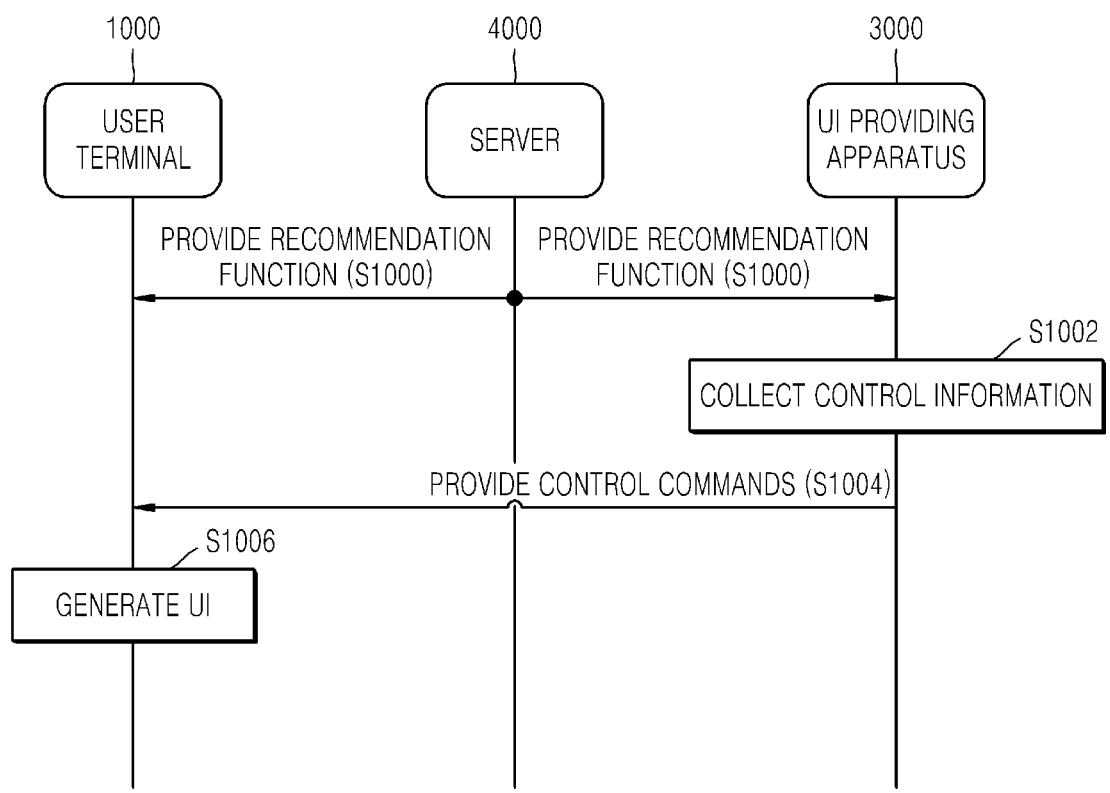
FIG. 10 is a detailed block flow diagram illustrating a method of generating a UI according to an embodiment of the present invention.

FIG. 10 is a detailed block flow diagram illustrating a method of generating a UI according to an embodiment of the present invention.

Referring to FIG. 10, in step S1000, the server 4000 provides the user terminal 1000 and the UI-providing apparatus 3000 with recommendation functions. The server 4000 provides the user terminal 1000 and the UI-providing apparatus 3000 with recommendation functions determined using control information received from the UI-providing apparatus 3000 in step S1000.

In step S1002, the UI-providing apparatus 3000 collects control commands. The UI-providing apparatus 3000 collects control commands corresponding to the recommendation functions from controlled devices in step S1002.

In step S1004, the UI-providing apparatus 3000 provides the user terminal 1000 with the collected control commands.

In step S1006, the user terminal 1000 generates the UI based on the recommendation functions and the control commands. A screen for generating the UI is provided to the user terminal 1000 based on the recommendation functions and the control commands in step 1006. This will be described in more detail with reference to FIG. 11.

An example of generating a UI used by the user terminal 1000 to control the controlled devices 2000 according to another embodiment of the present invention will now be described with reference to FIG. 11.

Figure 11:
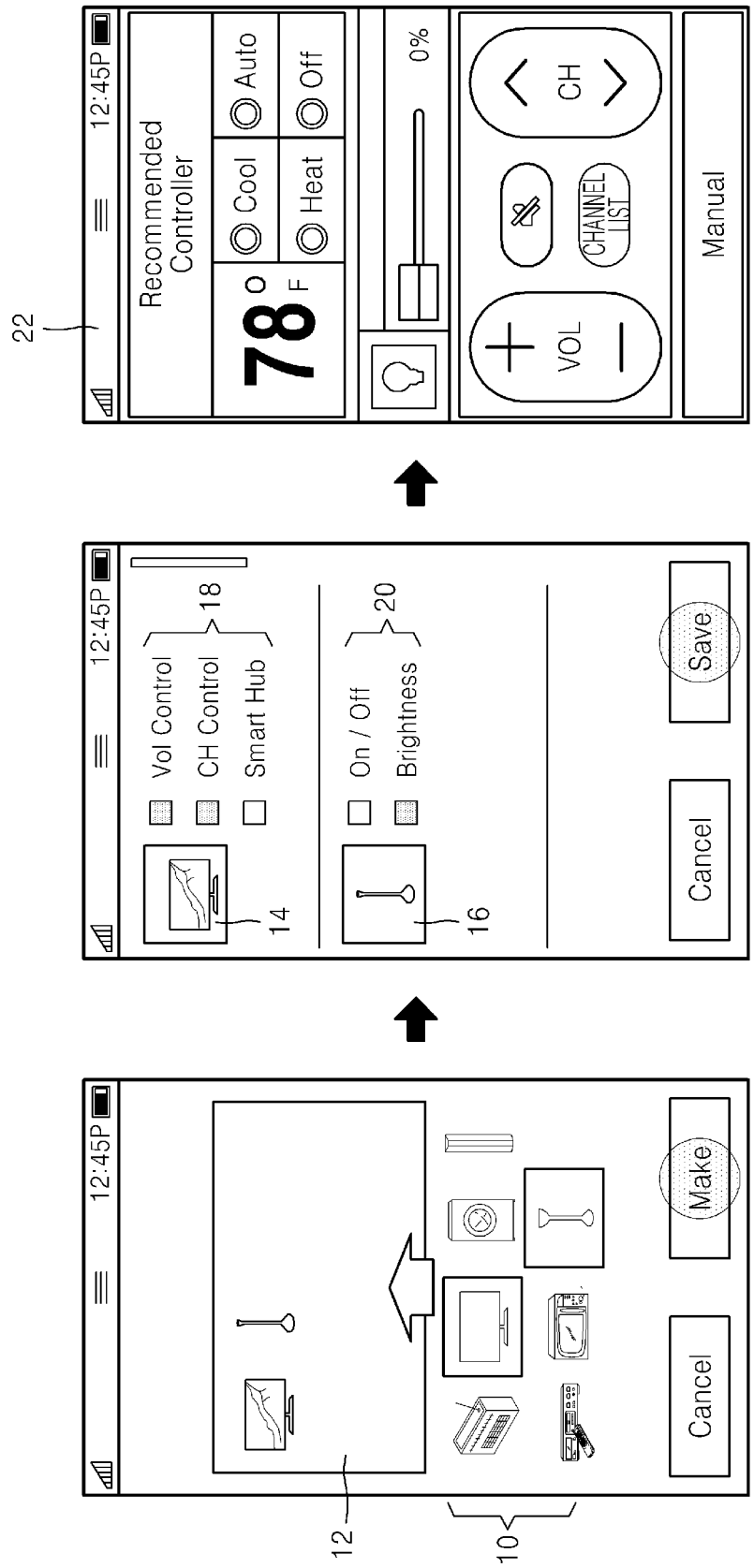
FIG. 11 illustrates generating a UI used by a user terminal to control controlled devices according to another embodiment of the present invention.

FIG. 11 illustrates generating a UI 22 used by the user terminal 1000 to control the controlled devices 2000 according to another embodiment of the present invention.

As described above, the user terminal 1000 receives recommendation functions and control commands corresponding to the recommendation functions from at least one of the server 4000 and the UI-providing apparatus 3000.

The user terminal 1000 also displays a list 10 of controlled devices and a region 12 on which selected controlled devices are displayed on a screen. A user selects devices included in the UI 22 for device control by moving the selected controlled devices to the region 12. Devices corresponding to the recommendation functions are displayed on the list 10 of the controlled devices based on the recommendation functions from at least one of the server 4000 and the UI-providing apparatus 3000.

After the controlled devices are selected, functions 18 and 20 of selected devices 14 and 16 are displayed on the screen of the user terminal 1000. The user selects some of the displayed functions 18 and 20 to allow the selected functions to be included in the UI 22 for device control.

The user terminal 1000 then generates the UI 22 for device control in the same way as the UI generating units 3400 and 3040.

According to an embodiment of the present invention, a UI can be generated and provided by analyzing a pattern of a controlled device controlled by a user.

According to another embodiment of the present invention, a UI can be generated and provided by combining frequently used functions of a plurality of controlled devices.

According to another embodiment of the present invention, a UI for controlling controlled devices used together among a plurality of controlled devices can be generated and provided.

The one or more embodiments of the present invention may be embodied as a recording medium, e.g., a program module to be executed in computers, which include computer-readable commands. The computer storage medium includes any usable medium that may be accessed by computers, volatile and non-volatile medium, and detachable and non-detachable medium. Also, the computer storage medium includes a computer storage medium and a communication medium. The computer storage medium includes all of volatile and non-volatile medium, and detachable and non-detachable medium, which are designed to store information including computer readable commands, data structures, program modules or other data. The communication medium includes computer-readable commands, a data structure, a program module, and other transmission mechanism, and includes other information transmission mediums.

The present invention may, however, be embodied in many different forms and should not be construed as being limited to the embodiments set forth herein; rather, these embodiments are provided so that this disclosure will be thorough and complete, and will fully convey the inventive concept to those of ordinary skill in the art.

While the present invention has been shown and described with reference to certain embodiments and drawings of the portable terminal, it will be understood by those skilled in the art that various changes in form and details may be made therein without departing from the spirit and scope of the invention as defined by the appended claims and their equivalents.

What is claimed is:

1. A user terminal comprising:
 a display; and
 a controller configured to:
 receive a user input for selecting a plurality of controlled devices comprising a first type of device and a second type of device;
 request first control command information from the first type of device and second control command information from the second type of device, wherein the first control command information corresponds to a first control function of the first type of device and the second control command information corresponds to a second control function of the second type of device;
 receive the first control command information from the first type of device and the second control command information from the second type of device; and
 control the display to display a user interface (UI) including a first area for displaying a current state of the first control function of the first type of device and a second area for displaying a current state of the second control function of the second type of device,
 wherein the first control function is a function for controlling a setting of the first type of device and the second control function is a function for controlling a setting of the second type of device,
 wherein the setting of the first type of device is a setting that is provided by the first type of device,
 wherein the setting of the second type of device is a setting that is provided by the second type of device, and
 wherein at least one of the first control command information and the second control command information comprises information regarding a user control history, the user control history comprising at least one of controlled time and controlled numbers.

2. The user terminal of claim 1, wherein the controller is further configured to:
 transmit at least one of the first control command information and the second control command information to a server through a communicator;
 receive recommendation information comprising information regarding the plurality of controlled devices and at least one corresponding control function based on at least one of the first control command information and the second control command information from the server; and
 display a list of the plurality of controlled devices and the at least one corresponding control function in the received recommendation information.

3. The user terminal of claim 2, wherein the recommendation information comprises information regarding a plurality of controlled devices that are controlled together at a value higher than a preset value.

4. The user terminal of claim 2, wherein the recommendation information comprises information regarding a plurality of control functions that are controlled together at a value higher than a preset value.

5. The user terminal of claim 2, wherein the recommendation information comprises information regarding at least one controlled device corresponding to an activity mode selected by a user.

6. The user terminal of claim 2, wherein the controller is further configured to change the UI based on at least one of the first control command information and the second control command information.

7. A user interface (UI) providing method, comprising:
receiving a user input for selecting a plurality of controlled devices comprising a first type of device and a type of second device;
requesting first control command information from the first type of device and second control command information from the second type of device, wherein the first control command information corresponds to a first control function of the first type of device and the second control command information corresponds to a second control function of the second type of device;
receiving the first control command information from the first type of device and the second control command information from the second type of device; and
controlling a display to display the UI including a first area for displaying a current state of the first control function of the first type of device and a second area for displaying a current state of the second control function of the second type of device,
wherein the first control function is a function for controlling a setting of the first type of device and the second control function is a function for controlling a setting of the second type of device,
wherein the setting of the first type of device is a setting that is provided by the first type of device,
wherein the setting of the second type of device is a setting that is provided by the second type of device, and
wherein at least one of the first control command information and the second control command information comprises information regarding a user control history, the user control history comprising at least one of controlled time and controlled numbers.

8. A non-transitory computer-readable recording medium having recorded thereon a program for executing a method, the method comprising:
receiving a user input for selecting a plurality of controlled devices comprising a first type of device and a second type of device;
requesting first control command information from the first type of device and second control command information from the second type of device, wherein the first control command information corresponds to a first control function of the first type of device and the second control command information corresponds to a second control function of the second type of device;
receiving the first control command information from the first type of device and the second control command information from the second type of device; and
controlling a display to display a user interface (UI) including a first area for displaying a current state of the first control function of the first type of device and a second area for displaying a current state of the second control function of the second type of device,
wherein the first control function is a function for controlling a setting of the first type of device and the second control function is a function for controlling a setting of the second type of device,
wherein the setting of the first type of device is a setting that is provided by the first type of device,
wherein the setting of the second type of device is a setting that is provided by the second type of device, and
wherein at least one of the first control command information and the second control command information comprises information regarding a user control history, the user control history comprising at least one of controlled time and controlled numbers.

* * * * *